(12) United States Patent
Sano et al.

(10) Patent No.: US 7,989,108 B2
(45) Date of Patent: Aug. 2, 2011

(54) NON-AQUEOUS ELECTROLYTE BATTERY AND PRODUCING METHOD THEREOF

(75) Inventors: Youko Sano, Osaka (JP); Teruaki Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 748 days.

(21) Appl. No.: 12/121,415

(22) Filed: May 15, 2008

(65) Prior Publication Data

US 2008/0286653 A1 Nov. 20, 2008

(30) Foreign Application Priority Data

May 18, 2007 (JP) ................................. 2007-132506

(51) Int. Cl.
*H01M 4/58* (2010.01)
*H01M 4/62* (2006.01)
(52) U.S. Cl. ..................................... 429/218.1; 429/217
(58) Field of Classification Search .................. 429/217, 429/218.1
See application file for complete search history.

(56) References Cited

FOREIGN PATENT DOCUMENTS

| JP | 2004-178922 | 6/2004 |
|---|---|---|
| JP | 2005-222933 | 8/2005 |

*Primary Examiner* — Helen Conley
(74) *Attorney, Agent, or Firm* — McDermott Will & Emery LLP

(57) ABSTRACT

A non-aqueous electrolyte battery of the present invention includes a positive electrode, a negative electrode, and a non-aqueous electrolyte. The negative electrode includes a molded body made by compression molding a granulated material containing a negative electrode active material, a conductive agent, and a binder. The negative electrode active material includes a Si-containing material. Volume-based 90% particle size R ($D_{90}$) of the negative electrode active material, volume-based 10% particle size Rz ($D_{10}$) and 90% particle size Rz ($D_{90}$) of the granulated material, and thickness T of the molded body satisfy the following relation formulae: (i) R ($D_{90}$)<Rz ($D_{10}$), (ii) Rz ($D_{90}$)<T, (iii) 34 µm≦Rz ($D_{10}$)≦126 µm, and (iv) 128 µm≦Rz ($D_{90}$)≦285 µm, and the electric conductivity of the granulated material is 0.05 S/cm or more when the density of the granulated material is 0.9 g/cm³.

7 Claims, 2 Drawing Sheets

F I G. 1
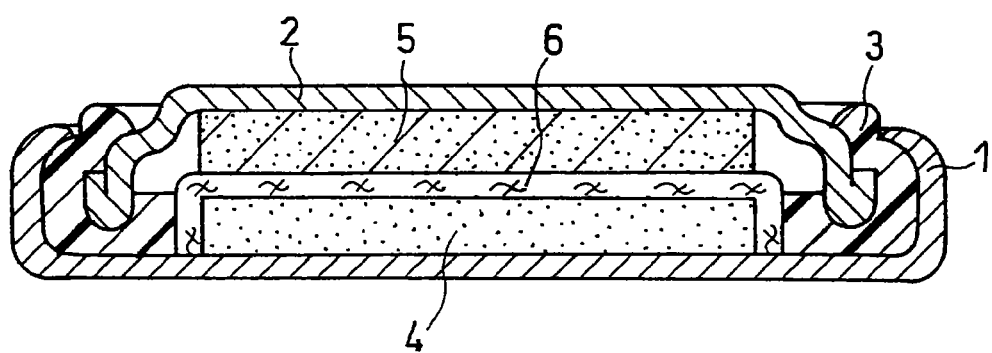

NON-AQUEOUS ELECTROLYTE BATTERY AND PRODUCING METHOD THEREOF

FIELD OF THE INVENTION

The present invention relates to non-aqueous electrolyte batteries. To be specific, the present invention relates to an improvement of a negative electrode used for non-aqueous electrolyte batteries.

BACKGROUND OF THE INVENTION

With portable devices becoming increasingly small-sized, lightweight, and high performance, lithium secondary batteries, which are used as a main power source or a backup power source therein, have been required to have high capacity.

Among portable devices, in digital still cameras, which have been in great demand recently, the main power source is removed from the main body quite often for a long period of time when not in use unlike mobile phones, in which the main power source is less likely to be removed from the device. Additionally, devices like digital still cameras have a longer operating life. Therefore, for a backup power source of digital still cameras, both high capacity and excellent charge and discharge cycle performance are required. Also, its size has to be small. Thus, for the backup power source, coin-type lithium secondary batteries with a diameter of 1 cm or less, and coin-type lithium primary batteries with a diameter of 2 cm or less are often used. Such a battery includes an electrode formed of a molded body in pellet form.

For the negative electrode active material of the lithium battery, Si (silicon)(4199 mAh/g)-type materials, which achieve high capacity, have been examined. Lithium batteries using SiO as the negative electrode active material have been put in practical use as a backup power source for mobile phones and digital still cameras.

However, non-carbon-type negative electrode materials such as the silicon-type materials undergo significant volume change when lithium ions are absorbed and desorbed. For example, in the case of silicon simple substance, silicon theoretically expands 4.1 times the original size at its maximum lithium absorption. On the other hand, in the case of graphite, using its intercalation reaction, lithium is intercalated between the layers of graphite. Therefore, the expansion rate of graphite is about 1.1.

Thus, when silicon-type materials are used as the negative electrode active material, with the significant volume change of the active material, gaps are created between the active material particles, decreasing the negative electrode portion that effectively contributes to battery capacity. The volume change also causes cracks to the active material particles, micronizing the active material particles. The micronization of the active material particles creates space between the particles, disconnecting the electron conductive network based on the contact between the particles. Therefore, the negative electrode portion not contributing to the electrochemical reaction increases, the internal resistance increases, and the charge and discharge capacity declines. This may cause insufficient battery performance.

To solve such problems, for example, Japanese Laid-Open Patent Publication No. 2004-178922 (document 1) has proposed mixing particles containing a compound including silicon atoms with vapor deposited carbon fiber, and covering at least a portion of the surface of the particles containing the compound including silicon atoms with a carbonaceous material.

Japanese Laid-Open Patent Publication No. 2005-222933 (document 2) has proposed a negative electrode material containing a carbon-type negative electrode active material with a specific surface area of 1 $m^2/g$ or more, a binder of styrene butadiene rubber, and carbon fiber with a fiber diameter of 1 to 1000 nm. Document 2 also discloses that the resistivity of the negative electrode at 25° C. is preferably 0.5 $\Omega$cm or less.

In documents 1 and 2, the electrode is made by mixing the electrode material with water or an organic solvent to obtain a paste, and applying the obtained paste to the current collector. In such an electrode, a thin material mixture layer containing an active material is carried on the current collector, and the current collector is attached to the material mixture layer by a binder. When the material mixture layer is thin, contacts between the active material particles can be kept easily in the case of a material mixture layer containing a conductive agent such as vapor deposited carbon fiber, and a material mixture layer containing a combination of carbon fiber and styrene butadiene rubber, compared with a conventional material mixture layer using carbon black such as acetylene black as the conductive agent. Further, in the case of the particles containing a compound including silicon atoms with at least the portion of the surface thereof covered with a carbonaceous material, charge and discharge cycle performance, and low temperature performance can be improved to a certain extent. Also, by decreasing the resistivity of the negative electrode, charge and discharge cycle performance can be improved to a certain degree.

On the other hand, in the case of coin-type batteries, a thick molded body in pellet form made by compression-molding a material mixture (granulated material) in a mold is used as the electrode. Such an electrode undergoes significant degree of expansion and contraction. Therefore, in the electrode made of the molded body, it is hard to keep the conductivity in the molded body, compared with the electrode made of a current collector and a thin active material layer formed thereon.

To be specific, when the active material expansion and contraction are repeated by charge and discharge, compared with the electrode including the current collector and the thin material mixture layer carried thereon, the electrode made of the molded body undergoes a high degree of expansion. Thus, even at least a portion of the active material particle surface is covered with a carbonaceous material, contact between the active material particles, i.e., the conductivity between the particles, cannot be kept just by mixing the active material particles with the vapor deposited carbon fiber, and charge and discharge cycle performance declines significantly.

Further, the molded body is usually molded with a high density to a certain degree, usually to secure the battery capacity and strength. Generally, the resistivity of the molded body is low with a high density, and high with a low density. With high density, the resistivity easily varies depending upon the mixing ratio of the materials included in the molded body. With low density, the resistivity easily varies depending upon the conditions of the molded body.

In the case of the active material with less volume change during charge and discharge (for example, graphite), with less density change of the molded body while charge and discharge, charge and discharge cycle performance can be improved by decreasing the resistivity of the molded body at the time of molding. That is, when making comparison between a molded body including an active material with less volume change and a conventional conductive agent such as acetylene black, and a molded body including an active material with less volume change and carbon fiber as the conductive agent, the latter molded body achieves a low resistivity, and cycle performance improves.

On the other hand, with the active material that undergoes significant expansion during charge such as Si simple substance, the density change of the molded body during charge and discharge is significant as well. Even with the active material expansion during charge, by discharge, the active material contracts to the size at the time of pre-charge. However, the molded body expanded due to the active material expansion during charge does not contract to the pre-charge state even discharged. Thus, in the molded body after discharge, the density at the time of molding is not kept, and gaps increase (that is, the density decrease) compared with the pre-charge state, and the contacts between the active material particles, i.e., the conductivity between the active material particles, cannot be kept. Therefore, decreasing the resistivity of the negative electrode molded body before battery assembly can only achieve a certain degree of effects. That is, even the resistivity of the molded body is decreased at the time of molding, unless the resistivity of the molded body during discharge cannot be decreased, charge and discharge cycle performance cannot be improved.

BRIEF SUMMARY OF THE INVENTION

A non-aqueous electrolyte battery of the present invention includes:
- a positive electrode;
- a negative electrode; and
- a non-aqueous electrolyte, wherein the negative electrode includes a molded body made by compression-molding a granulated material including a negative electrode active material, a conductive agent, and a binder, the negative electrode active material includes a Si-containing material. Volume-based 90% particle size R ($D_{90}$) of the negative electrode active material; volume-based 10% particle size Rz ($D_{10}$) and 90% particle size Rz ($D_{90}$) of the granulated material; and thickness T of the molded body satisfy the following relation formulae:

$$R (D_{90}) < Rz (D_{10}), \quad \text{(i)}$$

$$Rz (D_{90}) < T, \quad \text{(ii)}$$

$$34\ \mu m \leq Rz (D_{10}) \leq 126\ \mu m, \text{ and} \quad \text{(iii)}$$

$$128\ \mu m \leq Rz (D_{90}) \leq 285\ \mu m, \text{ and} \quad \text{(iv)}$$

the electric conductivity of the granulated material is 0.05 S/cm or more when the density of the granulated material is 0.9 g/cm$^3$.

The Si-containing material preferably includes at least one selected from the group consisting of Si simple substance, a Si alloy, and a Si oxide.

The binder preferably includes polyacrylic acid.

Preferably, the conductive agent includes a first conductive agent and a second conductive agent, and the granulated material is made by mixing slurry (obtained by mixing an aqueous dispersion of the first conductive agent with the binder) with a mixture of the second conductive agent and the active material, and then drying the whole mixture. Preferably, the bulk density of the first conductive agent is smaller than the bulk density of the second conductive agent.

The present invention also relates to a method for producing a non-aqueous electrolyte battery, the method including the steps of:

(a) mixing an aqueous dispersion of a first conductive agent with a binder to obtain slurry;

(b) mixing a second conductive agent with an active material to obtain a mixture;

(c) mixing the slurry with the mixture, and drying the whole mixture, to obtain a granulated material; and (d) compression molding the granulated material to obtain a molded body. Further, volume-based 90% particle size R ($D_{90}$) of the negative electrode active material; volume-based 10% particle size Rz ($D_{10}$) and 90% particle size Rz ($D_{90}$) of the granulated material; and thickness T of the molded body satisfy the following relation formulae:

$$R (D_{90}) < Rz (D_{10}), \quad \text{(i)}$$

$$Rz (D_{90}) < T, \quad \text{(ii)}$$

$$34\ \mu m \leq Rz (D_{10}) \leq 126\ \mu m, \text{ and} \quad \text{(iii)}$$

$$128\ \mu m \leq Rz (D_{90}) \leq 285\ \mu m. \quad \text{(iv)}$$

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 1 is a vertical cross section schematically illustrating a non-aqueous electrolyte battery in one embodiment of the present invention.

DETAILED DESCRIPTION OF THE INVENTION

Figure 2:
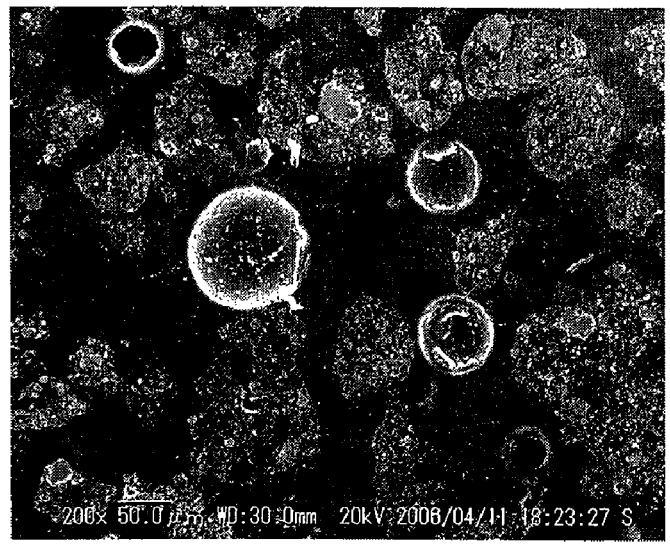
FIG. 2 is an electron micrograph of a granulated material made in Example 1.

A non-aqueous electrolyte battery of the present invention includes a positive electrode, a negative electrode, a non-aqueous electrolyte, and a separator interposed between the positive electrode and the negative electrode. The negative electrode includes a molded body made by compression molding a granulated material including a negative electrode active material, a conductive agent, and a binder. The negative electrode active material includes a Si-containing material. For example, in coin-type batteries, the negative electrode can be formed only of the molded body.

Further, in the present invention, volume-based 90% particle size R ($D_{90}$) of the negative electrode active material; 10% particle size Rz ($D_{10}$) and volume-based 90% particle size Rz ($D_{90}$) of the granulated material; and thickness T of the molded body satisfy the following relation formulae:

$$R (D_{90}) < Rz (D_{10}), \quad \text{(i)}$$

$$Rz (D_{90}) < T, \quad \text{(ii)}$$

$$34\ \mu m \leq Rz (D_{10}) \leq 126\ \mu m, \text{ and} \quad \text{(iii)}$$

$$128\ \mu m \leq Rz (D_{90}) \leq 285\ \mu m, \text{ and} \quad \text{(iv)}$$

the electric conductivity of the granulated material is 0.05 S/cm or more when the density of the granulated material is 0.9 g/cm$^3$.

When the negative electrode active material particles and the granulated material particles satisfy relation formulae (i) and (ii), the granulated material particles are inevitably larger than the negative electrode active material particles. Thus, the conductive agent is inevitably present at least a portion of the negative electrode active material particle surface. Further, since the granulated material particles become smaller than the thickness of the molded body, the granulated material particles are dispersed homogenously in the molded body, and therefore the expansion and contraction of the molded body becomes uniform.

To be specific, when R ($D_{90}$)<Rz ($D_{10}$) is satisfied, in the granulated material, the conductive agent particles and the binder particles are inevitably disposed around the negative electrode active material particles. Thus, the conductivity between the negative electrode active material particles can be kept excellently.

When Rz ($D_{90}$)<T, upon making the molded body by compression-molding the granulated material, even a pressure is applied to the granulated material, destruction and crushing of the granulated material can be prevented. Therefore, the conductive agent and the binder can be disposed excellently well around the active material particles.

Thickness T of the molded body is preferably 100 to 800 μm. Thickness T below 100 μm may make the production of the molded body difficult. With a battery having a diameter of 6 to 20 mm, the thickness of the negative electrode (molded body) is about 800 μm at the maximum.

When Rz ($D_{10}$)≦R ($D_{90}$), the active material particles not covered with the conductive agent is included in the granulated material. That is, each component in the granulated material is dispersed non-homogenously. When T≦Rz ($D_{90}$), the granulated material is partly broken due to the pressure at the time of molding, and the conductivity between the negative electrode active material particles cannot be kept. Also, each component in the molded body cannot be dispersed homogenously. Further, when the molded body is made by using a mass production apparatus, the weight of the molded body varies.

When making the molded body by molding the granulated material, to further curb the weight variation in the molded body, the particle size of the granulated material has to be adjusted. To be specific, Rz ($D_{10}$) has to be 34 μm to 126 μm, and Rz ($D_{90}$) has to be 128 μm to 285 μm. By setting Rz ($D_{10}$) and Rz ($D_{90}$) in the above ranges, each component in the granulated material can be dispersed homogenously.

When Rz ($D_{10}$) is below 34 μm, the interface of the granulated material particles increases, which leads to an increase in the amount of a non-conductive coating, which is derived from the non-aqueous electrolyte generated at the time of charge and discharge, at the interface. When Rz ($D_{10}$) exceeds 126 μm, the yield of the granulated material after the classification decreases.

When Rz ($D_{90}$) is below 128 μm, the yield of the granulated material after the classification decreases. When Rz ($D_{90}$) exceeds 285 μm, each component in the molded body cannot be dispersed homogenously. Further, in the mass production processes, the weight variation of the molded body increases.

The volume-based particle size distribution of the negative electrode active material particles and the granulated material particles can be determined, for example, by using a laser diffraction particle size distribution measurement device.

The particle size distribution of the negative electrode active material particles can be adjusted, for example, by controlling production conditions, crushing conditions, and classification conditions of the negative electrode active material particles. The particle size distribution of the granulated material can be adjusted, by controlling the granulation conditions and classification conditions.

Further, as described above, the electric conductivity of the granulated material when the density of the granulated material is 0.9 g/cm$^3$ is set to 0.05 S/cm or more.

The Si-containing material used as the negative electrode active material can achieve high capacity, compared with carbon materials. However, the Si-containing material undergoes volume changes with charge and discharge. For example, when a Ti 17 wt %-Si 83 wt % alloy is used as the Si-containing material, theoretically, the alloy has a capacity of 2687 mAh/g. However, the alloy expands 3.4 times the original size when charged. On the other hand, for example, although a Ti 98 wt %-Si 2 wt % alloy only expands to about 1.1 times the original size, i.e., about the same degree with graphite, theoretically, it only achieves a capacity of 76 mAh/g. For example, although a Ti 91 wt %-Si 9 wt % alloy achieves a capacity of about the same degree with graphite (theoretically 372 mAh/g), this alloy expands to 1.5 times the original size when charged. Therefore, when the volume change of the Si-containing material is 50% or more, a high capacity negative electrode can be obtained.

In the molded body containing an active material with a volume change rate of 50% or more during charge and discharge, the molded body expands when the active material absorbs Li and expands. However, even though the active material desorbs Li and contracts, the degree of the contraction of the molded body is not so high. Thus, the density of the molded body after discharge decreases to 0.9 g/cm$^3$ or less. In the present invention, the electric conductivity of the granulated material is 0.05 S/cm or more when the density of the granulated material forming the molded body is set to 0.9 g/cm$^3$. In this way, the molded body can keep excellent conductivity even under discharge condition (with a low density). That is, by setting the electric conductivity of the molded body after discharge high, even with repetitive charge and discharge cycles, conductivity in the molded body can be kept. Therefore, charge and discharge cycle performance of the battery can be improved.

When electric conductivity of the granulated material is below 0.05 S/cm with the density of 0.9 g/cm$^3$, the conductivity between the active material particles in the molded body declines under discharge conditions. The active material particles not forming the conductive network cannot contribute to charge and discharge reaction. As a result, battery capacity declines.

The electric conductivity can be calculated, for example, by measuring the thickness and the resistance of the sample when a weight of 20 to 400 kgf/cm$^2$ is applied to the sample of 2.0 g, by using a powder resistivity meter. For the powder resistivity meter, for example, a powder resistivity system MCP-PD41 manufactured by Mitsubishi Chemical Corporation may be used.

The electric conductivity can also be determined by using the meter other than the one mentioned above, as long as the weight, the area, the thickness, and the resistivity of the sample can be measured.

By molding the thus obtained granulated material, a molded body can be obtained. For example, a molded body can be obtained by molding the granulated material with a pressure of 50 to 1500 kg/cm$^2$. By setting the pressure within such a range when molding the granulated material, a molded body with sufficiently high density can be obtained. When the molding pressure is lower than the above range, a molded body with high density may not be obtained. When the molding pressure is larger than the above range, the metal mold may be damaged.

The Si-containing material used as the negative electrode active material preferably includes at least one selected from the group consisting of Si simple substance, an oxide including Si, and an alloy material including Si. Particularly, the Si-containing material preferably includes at least one selected from the group consisting of the oxide including Si and the alloy material containing Si.

For the alloy material containing Si, for example, may be mentioned is an alloy including phase A mainly composed of Si, and phase B comprising an intermetallic compound of Si and transition metal element M. In the alloy, transition metal element M is preferably at least one selected from the group consisting of Ti, Zr, Fe, Co, Ni, and Cu. Phase A may be crystalline or amorphous.

By using such an alloy material, battery cycle performance can be further improved. With repetitive charge and discharge, the negative electrode active material may be deteriorated. However, when the alloy material is used as the negative electrode active material, though the reasons are unclear, with the metal other than Si, even with repetitive charge and discharge, the alloy material deterioration can be curbed.

The weight ratio of phase A mainly composed of Si to phase B comprising an intermetallic compound of transition metal element M and Si is not particularly limited. With a low weight ratio of phase A, the expansion is curbed but the capacity is small. With a high weight ratio of phase A, although the capacity can be secured, a significant expansion occurs. Therefore, the weight ratio of phase A is preferably 5 to 95 wt %. The weight ratio of phase A is further preferably 10 to 95 wt %, and still further preferably 18 to 95 wt %, since a high capacity can be achieved. Particularly, the weight ratio of phase A is preferably 18 to 65 wt %, since high capacity can be obtained, and the expansion of the alloy material can be curbed.

The method for making the alloy material is not particularly limited. For example, the mechanical alloying method, the mechanical milling method, the casting method, the liquid quenching method, the ion beam sputtering method, the vacuum deposition method, the plating method, and the vapor-phase chemical reaction method may be used.

For the binder used in the negative electrode, for example, polyacrylic acid and polyimide may be used. Particularly, polyacrylic acid is preferable. Polyacrylic acid is soluble to water, and since the organic solvent is not used, environmental load upon mass production is small. Further, by using polyacrylic acid as the binder, the particles in the granulated material can be bound firmly.

The amount of the binder included in the molded body is not particularly limited, but preferably 5 to 15 parts by weight per 100 parts by weight of the negative electrode active material.

When the amount of the binder is below 5 parts by weight, the active material particles may not be bound firmly. When the amount of the binder exceeds 15 parts by weight, the weight ratio of the active material included in the molded body becomes small relatively, and may decrease the battery capacity.

The conductive agent used in the negative electrode is not particularly limited, as long as the electron conductor used as the conductive agent does not cause a chemical reaction under the voltage range of charge and discharge of the electrode material to be used. For example, a material selected from the group consisting of graphites, carbon blacks, carbon fiber, metal fiber, and organic conductive materials may be used.

The amount of the conductive agent included in the molded body is not particularly limited, but preferably 10 to 40 parts by weight per 100 parts by weight of the negative electrode active material. By setting the amount of the conductive agent within the above range, a molded body with excellent conductivity can be obtained. When the amount of the conductive agent is below 10 parts by weight, sufficient conductivity may not be obtained. When the amount of the conductive agent exceeds 40 parts by weight, the active material proportion in the molded body decreases, and therefore the capacity may decline.

Generally, conductive agents are hydrophilic. For example, a conductive agent made of a carbon material which is capable of achieving a high conductivity easily coagulates. Therefore, to set the electric conductivity of the granulated material to 0.05 S/cm or more when the granulated material density is 0.9 g/cm$^3$, it is important to disperse the conductive agent homogenously in the granulated material.

The molded body including such a granulated material can be made, for example, by using a method including the steps of:

(a) mixing an aqueous dispersion of a first conductive agent with a binder to obtain slurry;

(b) mixing a second conductive agent with an active material to obtain a mixture;

(c) mixing the slurry with the mixture and drying the whole mixture, to obtain a granulated material; and (d) compression molding the granulated material to obtain a molded body. The thus obtained granulated material and molded body preferably satisfy the relation formulae (i) to (iv) above.

In the method, the conductive agent includes a first conductive agent and a second conductive agent. The granulated material are made by mixing slurry obtained by mixing an aqueous dispersion of a first conductive agent with a binder; and a mixture of a second conductive agent and a negative electrode active material, and then drying the whole mixture.

As described above, coagulation of the conductive agent easily occurs, and therefore the conductive agent has to be dispersed forcibly. However, when the conductive agent, the binder, and the water are mixed, coagulation of the conductive agent and the binder occurs, making the dispersion of the conductive agent difficult. When the conductive agent and the binder are mixed without being dispersed in water, the conductive agent embraces the binder, and the binder also cannot be blended homogenously. When the conductive agent and the binder are dispersed non-uniformly in the slurry used for making the granulated material, the granulated material in which each component is homogenously dispersed cannot be obtained. Using the granulated material with each component unevenly dispersed causes variations in the molded body weight.

Thus, in the above method, a first conductive agent and a second conductive agent are used as the conductive agent, and slurry in which the first conductive agent and the binder are dispersed homogenously is mixed with a mixture of the second conductive agent and the negative electrode active material. Based on this method, each component is homogenously dispersed, and at least a portion of the negative electrode active material particle surface is covered with the conductive agent. Thus, the conductivity at the active material particle surface, and the conductivity between the active material particles can be kept excellently in the granulated material. Therefore, the granulated material made by this method shows excellent electric conductivity even with a low density. That is, even when the granulated material density is 0.9 g/cm$^3$, the electric conductivity of the granulated material can be set to 0.05 S/cm or more. As a result, the molded body made by using the granulated material can keep excellent conductivity even under discharge conditions, and as a result, a high capacity non-aqueous electrolyte battery with excellent charge and discharge cycle performance can be obtained.

When the first conductive agent, the second conductive agent, and the negative electrode active material are blended to obtain a mixture, and a binder is mixed in the obtained mixture, the conductive agents having different bulk densities cannot be mixed homogenously, and the first and the second conductive agents are unevenly distributed. Therefore, in this case as well, only the granulated material with unevenly distributed components can be obtained.

The method and the device for dispersing the conductive agent are not particularly limited, as long as the conductive agent can be distributed homogenously in the production method. For example, dispersing the first conductive agent in water, and mixing the second conductive agent with the negative electrode active material can be done by using a homogenizer or a mixer.

In the production method, the bulk density of the first conductive agent is preferably smaller than the bulk density of the second conductive agent. By using the granulated material including such conductive agents, a molded body with high energy density and excellent conductivity can be obtained.

The first conductive agent and the second conductive agent may include, as described above, at least one selected from the group consisting of graphites, carbon blacks, carbon fiber, metal fiber, and organic conductive materials. Particularly, the first conductive agent preferably includes carbon blacks or carbon fiber, and the second conductive agent preferably includes graphites. Carbon blacks and carbon fiber used for the first conductive agent have a small particle size, a large specific surface area, and a large bulk density. Thus, based on the first conductive agent, the conductivity of the active material particle surface can be improved. Further, graphites used as the second conductive agent improve the conductivity between the active material particles.

The specific surface area of carbon blacks and carbon fiber used as the first conductive agent is preferably 50 $m^2/g$ or more, and particularly preferably 200 $m^2/g$ or more, because the conductivity of the active material particle surface can be improved sufficiently.

Although the amounts of the first conductive agent and the second conductive agent to be added are not particularly limited, the amount of the first conductive agent is preferably 1 to 5 parts by weight per 100 parts by weight of the negative electrode active material, and the amount of the second conductive agent is preferably 5 to 35 parts by weight per 100 parts by weight of the negative electrode active material.

In the following, elements other than the negative electrode in a non-aqueous electrolyte battery of the present invention are described.

For the positive electrode, a molded body including a positive electrode active material may be used. The positive electrode molded body may include, as necessary, a conductive agent and a binder.

For the positive electrode active material, for example, metal oxides such as $LiCoO_2$, $LiNiO_2$, $LiMn_2O_4$, $LiMnO_2$, $Li_{0.55}MnO_2$, $Li_4Mn_5O_{12}$, $Li_2Mn_4O_9$, $V_2O_5$, $V_6O_{13}$, $MnO_2$, $WO_3$, $Nb_2O_5$, and $Li_{4/3}Ti_{5/3}O_4$; composite oxides such as $LiCo_{1-x}Ni_xO_2$, and $LiMn_{2-x}A_xO_4$ (A represents an element other than manganese); and polymers such as polyaniline may be used, without limitation. Among these materials, materials capable of absorbing and desorbing lithium are preferable. These materials may be used singly, or may be used in combination of two or more.

The conductive agent used in the positive electrode is not particularly limited, as long as the electronic conductor used as the conductive agent does not undergo a chemical change in the charge and discharge potential of the electrode material used. For example, graphites, carbon blacks, carbon fiber, metal fiber, organic conductive materials may be used. These materials may be used singly, or may be used in combination of two or more.

The amount of the conductive agent to be added in the positive electrode is not particularly limited.

For the binder material used in the positive electrode, those binders that are known in the art and that do not cause a chemical reaction in a voltage range of charge and discharge of the electrode material may be used. For such binder materials, for example, fluorocarbon resin, styrene butadiene rubber, fluorine rubber, polyacrylic acid, and polyvinylidene fluoride may be mentioned.

The non-aqueous electrolyte may include, for example, a non-aqueous solvent, and a solute dissolved therein. For the solute, for example, $LiPF_6$, $LiBF_4$, $LiClO_4$, $LiCF_3SO_3$, $LiN(CF_3SO_2)_2$, $LiN(C_2F_5SO_2)_2$, and $LiN(CF_3SO_2)(C_4F_9SO_2)$ may be used. These may be used singly, or may be used in combination of two or more.

For the non-aqueous solvent, for example, propylene carbonate, ethylene carbonate, butylene carbonate, vinylene carbonate, vinyl ethylene carbonate, dimethyl carbonate, diethyl carbonate, sulfolane, dimethoxyethane, diethoxyethane, tetrahydrofuran, dioxolane, and γ-butyrolactone may be used. These may be used singly, or may be used in combination of two or more.

The non-aqueous electrolyte may include, other than the non-aqueous solvent and the solute, a polymer carrying these. That is, the non-aqueous electrolyte may be gelled.

EXAMPLES

In the following, the present invention is described with reference to Examples. However, the present invention is not limited to these Examples.

Example 1

In this Example, a coin-type battery as shown in FIG. 1 was made. The battery includes a pellet positive electrode 4, a pellet negative electrode 5, a separator 6 interposed therebetween, a positive electrode can 1, and a negative electrode can 2. The opening of the positive electrode can 1 is crimped and sealed by the negative electrode can 2, which is provided with a gasket 3 at the periphery thereof. The battery had an external diameter of 6.8 mm, and a height of 1.4 mm.

(Negative Electrode Active Material Preparation)

For the negative electrode active material, a Si alloy material was used. The material was made by mechanical alloying as in below.

A powder mixture of Ti and Si in a weight ratio of 37:63 in an amount of 1.7 kg was placed in a container of a vibration mill (FV-20 manufactured by Chuo Kakohki Co., Ltd.). Then, in the container, stainless steel-made balls (a diameter of 2 cm) in an amount of 300 kg were placed. Inside of the container was decompressed by vacuum, and afterwards, to the container, an Ar gas (99.999% purity, manufactured by Nippon Sanso Corporation.) was introduced. The pressure in the container was set to 1 atmospheric pressure. Operation conditions of the vibration mill were set to, an amplitude of 8 mm, and the number of revolutions of 1200 rpm. The mechanical alloying operation was carried out for 80 hours under such conditions.

A Ti37 wt %-Si63 wt % alloy powder thus obtained by the above operation was classified by a sieve to give a particle size of 45 μm or less. The classified alloy material was used as the negative electrode active material. The volume-based particle size distribution of the negative electrode active material was measured. As a result, it was determined that R($D_{90}$) was 32 µm.

(Negative Electrode Preparation)

The negative electrode was made as in below. In this Example, the conductive agent included a first conductive agent and a second conductive agent. For the first conductive agent, carbon black (carbon ECP, a bulk density of 15 to 50 kg/m³ manufactured by Lion Corporation) was used, and for the second conductive agent, graphite (bulk density of 0.14 g/cm³ (140 kg/m³)) was used. As the binder, polyacrylic acid (AC-10H manufactured by Nihon Junyaku Co., Ltd.) was used.

First, slurry including the first conductive agent and the binder was prepared.

The first conductive agent (carbon black) was dispersed in water in a weight ratio of 1:67 (first conductive agent:water) by using a homogenizer (psyscotron NS-51 manufactured by Microtec Nition). A binder was added to the dispersion, and blended for further 2 hours by using the homogenizer to obtain slurry.

Then, the negative electrode active material obtained as described above was mixed with the second conductive agent (graphite), to obtain a mixture. To be specific, the negative electrode active material was mixed with the second conductive agent in a tumbling granulator (Granurex GX-20 manufactured by Freund Corporation). In the granulator, the flow temperature was set to 90° C. and the number of revolutions was set to 250 rpm.

Then, to the mixture in the granulator, the slurry obtained as described above was sprayed for granulation and then dried, to obtain a granulated material. In the obtained granulated material, the weight ratio between the negative electrode active material, the first conductive agent, the second conductive agent, and the binder was set to 73:2:18:7.

FIG. 2 shows an electron micrograph of a cross section of the obtained granulated material, the cross section obtained by grinding. It was confirmed that in the obtained granulated material, each component was mixed homogenously.

The obtained granulated material was classified with a sieve to give a particle size of 45 µm to 212 µm. The volume-based particle size distribution of the granulated material after classification was determined. As a result, Rz ($D_{10}$) was 57 µm and Rz ($D_{90}$) was 190 µm.

The classified granulated material was molded with a pressure of 1 ton/cm², to give a pellet of a diameter of 4.2 mm and a thickness of 0.23 mm, thereby obtaining a molded body. This molded body was dried under a reduced pressure for 10 hours at 190° C., and then to the dried molded body, a metal lithium was pressure-bonded so that the molar ratio of Li to Si was Li/Si=2.6. A negative electrode was thus obtained.

(Positive Electrode Preparation)

A lithium-containing manganese oxide was used as the positive electrode active material. The lithium-containing manganese oxide was obtained by mixing electrolytic manganese dioxide with lithium hydroxide in a 1:0.4 molar ratio of Mn:Li, and heat-treating the obtained mixture in air at 380° C. for 6 hours.

A positive electrode material mixture was obtained by mixing a positive electrode active material, carbon black as the conductive agent, fluorocarbon resin as the binder in a weight ratio of 90:6:4. This positive electrode material mixture was molded by a pressure of 1 ton/cm² into pellets with a diameter of 4.1 mm and a thickness of 0.60 mm, to obtain a molded body. This molded body was dried under a reduced pressure at 250° C. for 10 hours, to obtain a positive electrode.

A coin-type battery as shown in FIG. 1 was obtained, by using the thus obtained positive electrode and the negative electrode. A stainless steel (SUS 444)-made positive electrode can, and a stainless steel (SUS 403)-made negative electrode can were used. A polypropylene-made separator was used. The non-aqueous electrolyte was prepared by dissolving a lithium salt LiN($CF_3SO_2$)$_2$ in a solvent mixture of 2:1:2 (volume ratio) of propylene carbonate, ethylene carbonate, and dimethoxyethane with a concentration of 1 mol/L.

The obtained battery was named as a battery of Example 1.

Example 2

A battery of Example 2 was made in the same manner as Example 1, except that the negative electrode active material was mixed with the second conductive agent in the tumbling granulator with the number of revolutions of 300 rpm.

As the volume-based particle size distribution of the granulated material was measured after the classification, it was found that Rz ($D_{10}$) was 59 µm and Rz ($D_{90}$) was 192 µm.

Example 3

A battery of Example 3 was made in the same manner as Example 1, except that the negative electrode active material was mixed with the second conductive agent in the tumbling granulator with the number of revolutions of 200 rpm.

As the volume-based particle size distribution of the granulated material was measured after the classification, it was found that Rz ($D_{10}$) was 65 µm and Rz ($D_{90}$) was 195 µm.

Comparative Example 1

The negative electrode active material, the first conductive agent, and the second conductive agent were blended in the tumbling granulator with the number of revolutions of 250 rpm. To the obtained mixture, an aqueous solution of polyacrylic acid was sprayed for granulation, to obtain a granulated material. Other than the above, a battery of Comparative Example 1 was made in the same manner as Example 1.

As the volume-based particle size distribution of the granulated material was measured after the classification, it was found that Rz ($D_{10}$) was 60 µm and Rz ($D_{90}$) was 193 µm.

Comparative Example 2

A battery of Comparative Example 2 was made in the same manner as Example 1, except that styrene butadiene rubber (Crosrene SA-23, manufactured by Takeda Pharmaceutical Company Limited) was used instead of polyacrylic acid as the binder.

As the volume-based particle size distribution of the granulated material was measured after the classification, it was found that Rz ($D_{10}$) was 55 µm and Rz ($D_{90}$) was 190 µm.

Comparative Example 3

The Ti37 wt %-Si63 wt % alloy material made in Example 1 was classified with a sieve, to give a particle size of below 106 µm. The classified alloy material was used as the negative electrode active material. R($D_{90}$) of the negative electrode active material was 87 µm. A battery of Comparative Example 3 was made in the same manner as Example 1, except that this negative electrode active material was used.

As the volume-based particle size distribution of the granulated material was measured after the classification, it was found that Rz ($D_{10}$) was 57 µm and Rz ($D_{90}$) was 192 µm.

Figure 3:
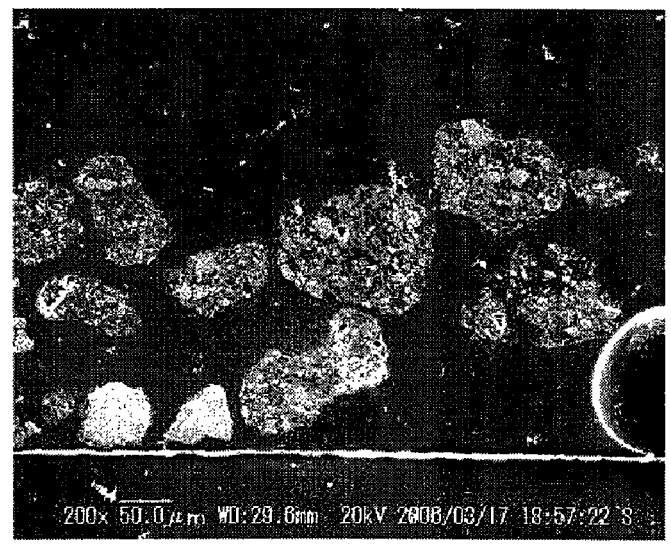
FIG. 3 is an electron micrograph of a granulated material made in Comparative Example 3.

FIG. 3 shows an electron micrograph of a cross section of the granulated material, the cross section obtained by grinding. As is clear from FIG. 3, a portion of the negative electrode active material particles was not covered by the conductive agent. That is, in the granulated material made in this Comparative Example, each component was distributed unevenly.

Comparative Example 4

A battery of Comparative Example 4 was made in the same manner as Example 1, except that the granulated material was classified with a sieve to give a particle size of 45 μm to 300 μm.

As the volume-based particle size distribution of the granulated material was measured after the classification, it was found that Rz ($D_{10}$) was 65 μm and Rz ($D_{90}$) was 285 μm.
[Evaluation]
(Measurement on Electric Conductivity of the Granulated Material)

The electric conductivity of the granulated material of Examples 1 to 3 and of Comparative Examples 1 to 4 was measured as described above by using a powder resistivity system, MCP-PD41 manufactured by Mitsubishi Chemical Corporation.
(Measurement of Capacity Retention Rate)

Respective batteries of Examples 1 to 3 and of Comparative Examples 1 to 4 were charged at a constant current of 0.2 mA/cm² until the battery voltage reached 3.2 V. The charged batteries were discharged at a constant current of 0.2 A/cm² until the battery voltage decreased to 2.0 V. Such charge and discharge were repeated. The current value is the value per unit area of the face of the positive electrode facing the negative electrode.

Table 1 shows R ($D_{90}$), Rz ($D_{10}$), Rz ($D_{90}$), thickness T of the molded body, and the electric conductivity of the granulated material when its density is 0.9 g/cm³. Further, the discharge capacity at the second cycle of each battery, and the ratio of the discharge capacity at the second cycle to the discharge capacity at the 10th cycle are shown as the capacity retention rate. In Table 1, the capacity retention rate is shown by percentage.

the conductive agent, and the binder were dispersed homogenously in the granulated material. Therefore, the granulated material made in Examples 1 to 3 achieves excellent conductivity at the active material particle surface and conductivity between the active material particles; and further the molded body made by using such a granulated material keeps conductivity even under discharge conditions.

Usually, in the case of batteries used as a backup power source of digital still cameras, a capacity of 50% or more has to be kept even after 200 cycles of charge and discharge. Therefore, the capacity retention rate at the 10th cycle is preferably 97.5% or more. Also, decline in capacity retention rate in charge and discharge cycles usually accelerates as deterioration advances. Therefore, the capacity retention rate at the 10th cycle is further preferably 99% or more.

However, the discharge capacity at the second cycle and the capacity retention rate declined in Comparative Examples 1 to 3, in which the electric conductivity of the granulated material was less than 0.05 S/cm when the density of the granulated material was set to 0.9 g/cm³.

In Comparative Example 1, the conductive agent is unevenly distributed since the slurry is not made with the conductive agent. That is, in the granulated material of Comparative Example 1, each component is distributed non-uniformly. Thus, in the molded body made with the granulated material, the conductivity at the active material particle surface and the conductivity between the active material particles declined, and the capacity retention rate declined. To be specific, the discharge capacity at the second cycle was not significantly declined, since in the initial stage of the charge and discharge, the conductivity at the active material particle surface and between the active material particles was kept by the pressure applied at the time of molding. However, in the molded body, the conductivity at the active material particle surface and between the active material particles was non-uniform, which created portions with significantly low conductivity. Therefore, with repetitive charge and discharge, the conductivity of the molded body could not be kept, decreasing the capacity retention rate.

TABLE 1

| | R ($D_{90}$) (μm) | Rz ($D_{10}$) (μm) | Rz ($D_{90}$) (μm) | Thickness T of the Molded Body (mm) | Electric Conductivity (S/cm) | Discharge Capacity at 2nd Cycle (mAh) | Capacity Retention Rate at 10th Cycle (%) |
|---|---|---|---|---|---|---|---|
| Ex. 1 | 32 | 57 | 190 | 0.23 | 0.055 | 2.77 | 99.5 |
| Ex. 2 | 32 | 59 | 192 | 0.23 | 0.054 | 2.77 | 99.5 |
| Ex. 3 | 32 | 65 | 195 | 0.23 | 0.053 | 2.76 | 99.5 |
| Comp. Ex. 1 | 32 | 60 | 193 | 0.23 | 0.032 | 2.75 | 95.4 |
| Comp. Ex. 2 | 32 | 55 | 190 | 0.23 | 0.012 | 2.23 | 55.1 |
| Comp. Ex. 3 | 87 | 57 | 192 | 0.23 | 0.035 | 2.76 | 95.9 |
| Comp. Ex. 4 | 32 | 65 | 285 | 0.23 | 0.055 | 2.77 | 98.9 |

Table 1 shows that discharge capacity at the second cycle, and the capacity retention rate were both excellent in Examples 1 to 3, in which the relation formulae (i) R ($D_{90}$) <Rz ($D_{10}$), (ii) Rz ($D_{90}$)<T, (iii) 34 μm≦Rz ($D_{10}$)≦126 μm, and (iv) 128 μm≦Rz ($D_{90}$)≦285 μm were satisfied, and the electric conductivity of the granulated material was 0.05 S/cm or more when the density was 0.9 g/cm³. Also, as shown in FIG. 2, it was confirmed that the active material particles, In Comparative Example 2, using styrene butadiene rubber as the binder instead of polyacrylic acid, the electric conductivity of the granulated material with the density set to 0.9 g/cm³ declined. Although details are unclear, this is probably because polyacrylic acid achieves face-bonding, whereas styrene butadiene rubber achieves point-bonding. Therefore, in the granulated material including styrene butadiene rubber, the binding force between particles was declined. Therefore, the conductivity of the molded body using such a granulated material declined, decreasing the electric conductivity.

Further, in the battery of Comparative Example 2, the discharge capacity at the second cycle and the capacity retention rate declined. Binding force of styrene butadiene rubber is lower than polyacrylic acid. Thus, with repetitive charge and discharge, the active material, the conductive agent, and the binder could not keep the form of the granulated material, decreasing the conductivity of the molded body. Therefore, the discharge capacity and the capacity retention rate at the second cycle both declined.

In Comparative Example 3, in which R $(D_{90})$>Rz $(D_{10})$, that is, the particle size of the active material particles was within the range of the particle size of the granulated material, the electric conductivity of the granulated material when the density was set to 0.9 g/cm$^3$, and the capacity retention rate declined.

As shown in FIG. 3, it was confirmed that the granulated material of Comparative Example 3 was a non-homogenous material mixture including the active material particles that were not granulated (that is, not in contact with the conductive agent). The electric conductivity declined probably because the granulated material in Comparative Example 3 was non-homogenous.

The discharge capacity at the second cycle did not decline significantly since in the initial stage of charge and discharge, the conductivity at the active material particle surface and between active material particles was secured due to the pressure applied at the time of molding in the molded body. However, the granulated material of Comparative Example 3 included the active material that was not in contact with the conductive agent. The capacity retention rate declined probably because such an independent active material could not secure the conductivity, and with repetitive charge and discharge, the conductivity declined at the portion where the independent active material was present in the molded body.

Rz $(D_{90})$>T, i.e., in Comparative Example 4, in which the range of the particle size of the granulated material was more than the thickness of the molded body, the capacity retention rate slightly declined.

The discharge capacity at the second cycle was excellent, since in the initial period of charge and discharge, the conductivity at the active material particle surface and between the active material particles was secured due to the pressure applied at the time of molding. As described above, it is probably because the particle size range of the granulated material was more than the thickness of the molded body, the granulated material was partially broken due to the pressure applied at the time of molding. The partially broken granulated material due to the pressure applied at the time of molding accelerates the decline in the conductivity at the active material particle surface and between the active material particles with repetitive charge and discharge. Thus, the capacity retention rate declined.

Example 4

The Ti37 wt %-Si63 wt % alloy material made in Example 1 was classified with a sieve to give a particle size of below 20 μm. The classified alloy material was used as the negative electrode active material. The negative electrode active material had R $(D_{90})$ of 13 μm.

By using this negative electrode active material, granulated material was made in the same manner as Example 1, and the obtained granulated material was classified with a sieve to give a particle size of 20 μm to 212 μm. A battery of Example 4 was made in the same manner as Example 1 except for the above.

As the volume-based particle size distribution of the granulated material was measured after the classification, it was found that Rz $(D_{10})$ was 34 μm and Rz $(D_{90})$ was 189 μm.

Example 5

A battery of Example 5 was made in the same manner as Example 1, except that the granulated material was classified with a sieve to give a particle size of 106 μm to 212 μm.

As the volume-based particle size distribution of the granulated material was measured after the classification, it was found that Rz $(D_{10})$ was 126 μm and Rz $(D_{90})$ was 195 μm.

Comparative Example 5

The Ti37 wt %-Si63 wt % alloy material made in Example 1 was classified with the sedimentation method to give a particle size of below 1 μm. The classified alloy material was used as the negative electrode active material. R $(D_{90})$ of the negative electrode active material was 0.4 μm.

By using this negative electrode active material, a granulated material was made in the same manner as Example 1. The obtained granulated material was classified with the sedimentation method and a sieve to give a particle size of 1 μm to 212 μm.

Other than the above, a battery of Comparative Example 5 was made in the same manner as Example 1.

As the volume-based particle size distribution of the granulated material was measured after the classification, it was found that Rz $(D_{10})$ was 12 μm and Rz $(D_{90})$ was 195 μm.

Comparative Example 6

A battery of Comparative Example 6 was made in the same manner as Example 1, except that the granulated material was classified with a sieve to give a particle size of 150 μm to 212 μm.

As the volume-based particle size distribution of the granulated material was measured after the classification, it was found that Rz $(D_{10})$ was 168 μm and Rz $(D_{90})$ was 190 μm.

Example 6

A battery of Example 6 was made in the same manner as Example 1, except that the granulated material was classified with a sieve to give a particle size of 45 μm to 150 μm.

As the volume-based particle size distribution of the granulated material was measured after the classification, it was found that Rz $(D_{10})$ was 57 μm and Rz $(D_{90})$ was 128 μm.

Example 7

The granulated material made in Example 1 was classified with a sieve to give a particle size of 45 μm to 300 μm. As the volume-based particle size distribution of the granulated material was measured after the classification, it was found that Rz $(D_{10})$ was 59 μm and Rz $(D_{90})$ was 285 μm.

The obtained granulated material was molded with a pressure of 1 ton/cm$^2$ to give pellets with a diameter of 3.6 mm and a thickness of 0.32 mm, thereby obtaining a molded body. Except for the above, a battery of Example 7 was made in the same manner as Example 1.

Comparative Example 7

A battery of Comparative Example 7 was made in the same manner as Example 1, except that the granulated material was classified with a sieve to give a particle size of 45 µm to 106 µm.

As the volume-based particle size distribution of the granulated material was measured after the classification, it was found that Rz ($D_{10}$) was 68 µm and Rz ($D_{90}$) was 80 µm.

Comparative Example 8

The granulated material made in Example 1 was classified with a sieve to give a particle size of 45 µm to 425 µm. As the volume-based particle size distribution of the granulated material was measured after the classification, it was found that Rz ($D_{10}$) was 58 µm and Rz ($D_{90}$) was 399 µm.

The obtained granulated material was molded into pellets with a diameter of 3.0 mm and a thickness of 0.44 mm, with a pressure of 1 ton/cm². However, since the granulated material included particles with a large particle size, when the molded body is made with a mass production apparatus, the molded body weight varied. Thus, among the molded bodies thus made, only a portion of the molded bodies with a uniform weight could be used.

By using the obtained molded body, a battery of Comparative Example 8 was made in the same manner as Example 1.

The electric conductivity with the density of 0.9 g/cm³ was measured as described above for the granulated materials made in Examples 4 to 7 and Comparative Examples 5 to 8. The capacity retention rate of respective batteries was measured as well in the same manner as above. The results are shown in Table 2. Table 2 also shows R ($D_{90}$), Rz ($D_{10}$), Rz ($D_{90}$), thickness T of the molded body, yield of the granulated material after the classification, and discharge capacity of each battery at the second cycle. The yield of the granulated material after the classification is the weight ratio of the granulated material after classification to the granulated material before classification shown by percentage.

because the conductivity at the active material particle surface and between the active material particles was kept well in the molded body made in these Examples.

On the other hand, the electric conductivity of the granulated material when the density was set to 0.9 g/cm³ and the capacity retention rate declined in Comparative Example 5, in which Rz ($D_{10}$) was below 34 µm, i.e., the particle size of the particles included in the granulated material was small, and the particle size R ($D_{90}$) of the negative electrode active material was small. With the small particle size of the negative electrode active material R ($D_{90}$), the specific surface area of the active material particles significantly increases. Thus, unless the amounts of the conductive agent and the binder are not increased, the conductivity cannot be kept. The electric conductivity declined probably because of such a reason. Further, the granulated material of Comparative Example 5 included the particles with a small particle size, and therefore the interface included in the granulated material increased. When the interface included in the granulated material increases, the amount of the non-conductive film which is generated at the interface and derived from the non-aqueous electrolyte also increases. Therefore, the discharge capacity at the second cycle slightly declined, and the capacity retention rate declined.

In the case of Comparative Example 6, with Rz ($D_{10}$) of more than 126 µm, and of Comparative Example 7, with Rz ($D_{90}$) of less than 128 µm, the discharge capacity at the second cycle and the capacity retention rate both achieved excellent values. However, with a narrow particle size range at the time of the classification, the yield after the classification drastically declined. In this case, productivity would significantly decline.

Comparative Example 8 with Rz ($D_{90}$) of more than 285 µm achieved a high discharge capacity at the second cycle and a high capacity retention rate. However, with a large particle size of the granulated material, the molded body weight varied and among the molded bodies made, only a portion of the molded bodies with a uniform weight could be used. In this case as well, productivity would decline.

TABLE 2

|  | R ($D_{90}$) (µm) | Rz ($D_{10}$) (µm) | Rz ($D_{90}$) (µm) | Thickness T of the Molded Body (mm) | Electric Conductivity (S/cm) | Yield after Classification of Granulated Material (%) | Discharge Capacity at $2^{nd}$ Cycle (mAh) | Capacity Retention Rate at 10th Cycle (%) |
|---|---|---|---|---|---|---|---|---|
| Ex. 1 | 32 | 57 | 190 | 0.23 | 0.055 | 83 | 2.77 | 99.5 |
| Ex. 4 | 13 | 34 | 189 | 0.23 | 0.050 | 84 | 2.75 | 99.3 |
| Ex. 5 | 32 | 126 | 195 | 0.23 | 0.052 | 59 | 2.77 | 99.5 |
| Ex. 6 | 32 | 57 | 128 | 0.23 | 0.053 | 70 | 2.77 | 99.3 |
| Ex. 7 | 32 | 59 | 285 | 0.32 | 0.054 | 89 | 2.76 | 99.5 |
| Comp. Ex. 5 | 0.4 | 12 | 195 | 0.23 | 0.039 | 85 | 2.73 | 96.7 |
| Comp. Ex. 6 | 32 | 168 | 190 | 0.23 | 0.055 | 32 | 2.77 | 99.5 |
| Comp. Ex. 7 | 32 | 68 | 80 | 0.23 | 0.052 | 12 | 2.76 | 99.4 |
| Comp. Ex. 8 | 32 | 58 | 399 | 0.44 | 0.054 | 91 | 2.76 | 99.3 |

Table 2 shows that the discharge capacity at the second cycle and the capacity retention rate are both excellent in Examples 1 and 4 to 7, in which relation formulae (i) R ($D_{90}$)<Rz ($D_{10}$), (ii) Rz ($D_{90}$)<T, (iii) 34 µm≦Rz ($D_{10}$)≦126 µm, and (iv) 128 µm≦Rz ($D_{90}$)≦285 µm were satisfied, and the electric conductivity of the granulated material was 0.05 S/cm or more when the density of the granulated material was 0.9 g/cm³. Such excellent results were obtained probably As described above, even under discharge state, the conductivity of the negative electrode molded body can be kept by using a granulated material satisfying the relation formulae (i) R ($D_{90}$)<Rz ($D_{10}$), (ii) Rz ($D_{90}$)<T, (iii) 34 µm≦Rz ($D_{10}$)≦126 µm, and (iv) 128 µm≦Rz ($D_{90}$)≦285 µm, and having the electric conductivity of 0.05 S/cm or more when the density is 0.9 g/cm³. Therefore, based on the present invention, a non-aqueous electrolyte battery with excellent discharge capacity and charge and discharge cycle performance can be obtained with high productivity.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte battery comprising a positive electrode, a negative electrode, and a non-aqueous electrolyte,
   wherein said negative electrode includes a molded body made by compression molding a granulated material including a negative electrode active material, a conductive agent, and a binder,
   said negative electrode active material includes a Si-containing material,
   wherein a volume-based 90% particle size R ($D_{90}$) of said negative electrode active material, a volume-based 10% particle size $R_z$ ($D_{10}$) and a volume based 90% particle size $R_z$ ($D_{90}$) of said granulated material, and a thickness T of the molded body, satisfies the following relationship formulae:

$$R\ (D_{90}) < Rz\ (D_{10}), \quad (i)$$

$$Rz\ (D_{90}) < T, \quad (ii)$$

$$34\ \mu m \leq Rz\ (D_{10}) \leq 126\ \mu m,\ and \quad (iii)$$

$$128\ \mu m \leq Rz\ (D_{90}) \leq 285\ \mu m,\ and \quad (iv)$$

an electric conductivity of said granulated material is 0.05 S/cm or more when a density of said granulated material is 0.9 g/cm³.

2. The non-aqueous electrolyte battery in accordance with claim 1, wherein said Si-containing material includes at least one selected from the group consisting of Si simple substance, a Si alloy, and a Si oxide.

3. The non-aqueous electrolyte battery in accordance with claim 1, wherein said binder comprises polyacrylic acid.

4. The non-aqueous electrolyte battery in accordance with claim 1, wherein said conductive agent comprises a first conductive agent and a second conductive agent, and
   said granulated material is made by mixing
      slurry obtained by mixing an aqueous dispersion of said first conductive agent with said binder, with
      a mixture of said second conductive agent and said active material, and then drying the whole mixture.

5. The non-aqueous electrolyte battery in accordance with claim 4, wherein a bulk density of said first conductive agent is smaller than a bulk density of said second conductive agent.

6. A method for producing a non-aqueous electrolyte battery, the method comprising the steps of:
   (a) mixing an aqueous dispersion of a first conductive agent with a binder to obtain slurry;
   (b) mixing a second conductive agent with an active material to obtain a mixture;
   (c) mixing said slurry with said mixture, and drying the whole mixture to obtain a granulated material; and
   (d) compression molding said granulated material to obtain a molded body,
   wherein volume-based 90% particle size R ($D_{90}$) of said negative electrode active material, volume-based 10% particle size Rz ($D_{10}$) and 90% particle size Rz ($D_{90}$) of said granulated material, and thickness T of said molded body satisfy the following relation formulae:

$$R\ (D_{90}) < Rz\ (D_{10}), \quad (i)$$

$$Rz\ (D_{90}) < T, \quad (ii)$$

$$34\ \mu m \leq Rz\ (D_{10}) \leq 126\ \mu m,\ and \quad (iii)$$

$$128\ \mu m \leq Rz\ (D_{90}) \leq 285\ \mu m. \quad (iv)$$

7. The method for producing a non-aqueous electrolyte battery in accordance with claim 6, wherein said negative electrode active material includes a Si-containing material, and said Si-containing material includes at least one selected from the group consisting of Si simple substance, a Si alloy, and a Si oxide.

* * * * *